United States Patent Office

3,236,919
Patented Feb. 22, 1966

3,236,919
BISORGANOPHOSPHORUS ESTERS
Karoly Szabo, Pleasantville, N.Y., and John G. Brady, San Jose, Calif., assignors to Stauffer Chemical Company, New York, N.Y., a corporation of Delaware
No Drawing. Filed July 17, 1962, Ser. No. 210,571
4 Claims. (Cl. 260—929)

This invention relates to organophosphorus esters and in particular to bisthiophosphonic acid esters and to a method of preparing them. The invention also pertains to biocidal compositions containing as the active component thereof at least one of the aforenamed compounds.

In accordance with the present invention, it has been discovered that certain bisthiophosphonic acid esters wherein two thiophosphonic acid residues are linked through an oxyalkylene bridge are exceedingly effective in controlling pest organisms belonging within the lower orders of classification. It is therefore a primary object and purpose of this invention to provide toxicants as above described and a manner of preparing and using them. Other objects and purposes will become apparent as the description proceeds.

It is to be understood that the term "thiophosphonic acid" is a generic designation and is used herein to include phosphonothioic and phosphonodithioic acids.

The thiophosphonic acid esters contemplated by the invention can be illustrated by means of the following general formula:

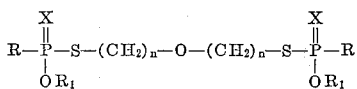

wherein R and $R_1$, which may be alike or different, represent lower alkyl radicals such as methyl, ethyl, n-propyl, iso-propyl, n-butyl, sec.-butyl, and the like; X is a chalcogen as represented by sulfur and oxygen, and $n$ is an integer having values of from 1 to 2.

Exemplary compounds falling within the ambit of the general formula are listed below:

(1) Bis-[2-(O-ethyl ethylphosphonodithioyl) ethyl] ether
(2) Bis-[2-(O-sec.-butyl ethylphosphonodithioyl) ethyl] ether
(3) Bis-[2-(O-methyl methylphosphonodithioyl) ethyl] ether
(4) Bis-(O-methyl ethylphosphonodithioyl) methyl ether
(5) Bis-(O-ethyl ethylphosphonodithioyl) methyl ether
(6) Bis-(O-ethyl ethylphosphonothioyl) methyl ether
(7) Bis-(O-isopropyl ethylphosphonothioyl) methyl ether
(8) Bis-(O-isobutyl ethylphosphonodithioyl) methyl ether
(9) Bis-[2-(O-methyl sec.-butylphosphonodithioyl) ethyl] ether
(10) Bis-(O-methyl ethylphosphonothioyl) methyl ether The bisthiophosphonic acid esters of the invention can be realized by a generalized method of synthesis which comprises condensing, preferably in the presence of a basic condensing agent, about 1 mole of a dihalodialkyl ether of the following formula:

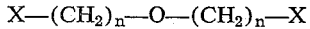

wherein $n$ has the significance previously designated and X represents a halogen atom, i.e. chlorine, bromine and the like, with about 2 moles of a lower alkyl ester of a thiophosphonic acid. The course of the reaction can be schematically indicated by the following chemical equation:

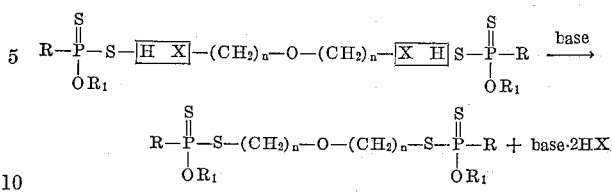

wherein X, R, $R_1$ and $n$ have the significance previously defined. In general, it has been our finding that excellent results and yields are obtained by heating the requisite thiophosphonic acid component and dihalodialkyl ether in approximately a 2:1 molar ratio in a relatively inert normally liquid organic solvent while using a tertiary amine as the basic condensing agent. Suitable solvent mediums are exemplified by liquid aromatic hydrocarbons such as benzene, toluene, xylene, etc., saturated aliphatic hydrocarbons such as hexane, heptane, cyclohexane, etc. and saturated aliphatic ethers. Basic condensing agents which have been found satisfactory for effecting the reaction include basic organic amines, preferably tertiary amines as represented by the lower trialkylamines, e.g. trimethylamine, triethylamine, etc., tertiary heterocyclic amines such as pyridine, picoline, quinoline, etc., inorganic bases and basic salts, e.g. alkali metal carbonates, e.g. sodium carbonate, potassium hydroxide, and the like. In some instances the reaction is advantageously performed in a medium capable of functioning both as a solvent and as the basic condensing agent. Pyridine and quinoline are examples of such dual purpose solvents.

Reference is now made to the following examples which are presented for the purpose of illustration only since variations in practicing the invention without departing from the spirit or scope thereof will be apparent to those skilled in the art to which the said invention pertains.

EXAMPLE 1

Bis-[2-(O-ethyl ethylphosphonodithioyl) ethyl] ether

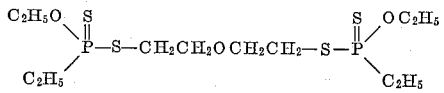

7.1 g. (0.05 mole) of bis-(2-chloroethyl) ether, 17 g. (0.1 mole) of O-ethyl ethylphosphonodithioic acid, 10.5 g. of triethylamine and 80 ml. of xylene were placed in a flask equipped with a reflux condenser and the resultant mixture gradually heated to 130–135° C. When the temperature had reached 125° C., the reaction became vigorously exothermic and the hydrochloride salt began to precipitate. The reaction mixture was maintained at about 125° C. for 1 hour and allowed to cool to ambient temperature. The hydrochloride was then filtered off and the filtrate washed with water followed by 2% sodium hydroxide and then with water. The organic layer was dried over magnesium sulfate and the solvent removed under reduced pressure. The yield of residual yellowish oil amounted to about 90% and the chemical analysis was in consonance with the above depicted structure. The $N_D{}^{25}$ of the product was 1.5458.

EXAMPLE 2

Bis-(O-ethyl ethylphosphonodithioyl) methyl ether

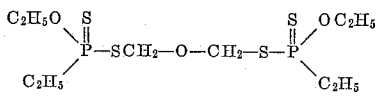

This compound was prepared in accordance with the above described procedure except the bis (2-chloroethyl) ether of Example 1 was replaced by an equivalent amount of bischloromethyl ether. The results and yield paralleled the previous example. The product in this case was a yellow oil having an $N_D^{25}$ of 1.5665.

EXAMPLE 3

*Bis-(O-methyl ethylphosphonothioyl) methyl ether*

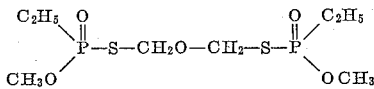

12.4 g. (0.22 mole) of potassium hydroxide in 27.5 ml. of water was combined with a mixture of 55 ml. of methanol and 14 ml. of water. To this was added with stirring 0.11 mole of O-methyl ethylphosphonochloridothioate. A spontaneous reaction occurred which gradually subsided as the addition was completed. The reaction mixture was maintained at 70–73° C. for 2 hours and then 5.75 g. (0.05 mole) of bischloromethylether was introduced and the mixture refluxed for half an hour.

The contents of the flask were transferred to a rotating evaporator and the methanol removed under reduced pressure. The precipitated oil was separated from the aqueous phase, which subsequently was extracted three times with benzene. The oily layer and organic extracts were combined, dried over anhydrous magnesium sulfate and filtered. The benzene was removed under reduced pressure leaving a yellow oily product corresponding in structure to the above depicted formula and having a refractive index of 1.5060 at 25° C.; yield 12.5 g.

As stated elsewhere herein, the bisthiophosphonic acid esters of the invention are eminently useful and suitable for combating a variety of pests of the type which are catalogued in the lower orders of classification as exemplified by cockroaches, milkweed bugs, house flies, two-spotted mites, salt water caterpillars, and the like. It is moreover to be understood that the toxicants of the invention may be used directly on the adult pest organisms or its various metamorphic stages including the eggs. In any event, the end result is to eradicate or control the pest organisms.

As those in the art are well aware, various techniques are available for incorporating the active component or toxicant in suitable pesticidal compositions. Thus, pesticidal compositions can be conveniently prepared in the form of liquids or solids, the latter preferably as homogeneous free-flowing dusts commonly formulated by admixing the active component with finely divided solids or carriers as exemplified by talc, natural clays, diatomaceous earth, various flours such as walnut shell, wheat, soya bean, cotton seed and so forth.

Liquid compositions are also useful and normally comprise a dispersion of the toxicant in a liquid media. For instance, it may be convenient to dissolve the toxicant directly in a solvent such as kerosene, fuel oil, xylene, alkylated naphthalenes or the like and use such organic solutions directly. However, it is more common procedure to employ dispersions of the toxicant in an aqueous media and such compositions may be produced by forming a concentrated solution of the toxicant in a suitable organic solvent followed by dispersion in water, usually with the aid of surface active agents The latter, which may be the anionic, cationic or nonionic types, are exemplified by sodium stearate, potassium oleate and other alkaline metal soaps and detergents such as sodium lauryl sulfate, sodium naphthalene sulfonate, sodium alkyl naphthalene sulfonate, methyl cellulose, polyoxyethylene, fatty alcohol ethers, polyglycol fatty acid esters and other polyoxyethylene surface active agents. The proportion of these agents commonly comprises 1–15% by weight of the pesticidal compositions although the proportion is not critical and may be varied to suit any particular need.

Other adjuncts may be resorted to in compounding biocidal formulations based on the herein described bisthiophosphonic acid esters and, in this connection, reference is made to adhesives, spreaders, activators, fertilizers, and the like. The preparation of pesticidal compositions incorporating the bisthiophosphonic acid esters of this invention and the results of testing such compositions are spelled out in the following test procedures:

*Acaricidal evaluation test.*—The two-spotted mite, *Tetranychus telarius* (Linn.) is employed in tests for acaricides. Young pinto bean plants in the primary leaf stage which have been infested with several hundred mites are sprayed to run-off at 10 p.s.i. with a test suspension in which the concentration of toxicant is 0.1%. A DeVilbiss hand sprayer was used to apply the test suspension. The sprayed plants are transferred to the greenhouse and the post-embryonic, nymphal, and ovicidal activity determined and recorded after seven days. The percent of kill is determined by comparison with control plants which have not been sprayed and the LD–50 values calculated using well-known procedures.

*Acaricidal evaluation test (systemic).*—Pinto bean plants in the primary leaf stage are placed in bottles containing 200 ml. of the test solution and held in place by means of cotton plugs; only the roots are immersed. The solutions are prepared by dissolving the test compound in acetone followed by dilution with distilled water. The final concentration of toxicant never exceeds 1.0%.

The initial concentration in which the toxicants are tested is 10 p.p.m. After the plants are placed in the test solution, they are infested with mites and the mortalities, including post-embryonic, nymphal and ovicidal, are determined after seven days. It is to be noted that in the systemic tests the root absorption and upward translocation of the candidate toxicant is measured and evaluated.

*Insecticidal evaluation tests.*—Four insect species are subjected to evaluation tests for insecticides:

(1) American cockroach (AR) _____ *Periplaneta americana* (Linn.).
(2) Milkweed bug (MWB) _____ *Oncopeltus fasciatus* (Dallas).
(3) House fly (HF) ___ *Musca domestica* (Linn.).
(4) Salt-marsh caterpillar (SMC) ___ *Estigmene acrea* (Drury).

Adult house flies and nymphs of the American cockroach and spotted milkweed bug are caged in cardboard mailing tubes with cellophane bottoms and coarse mesh nylon tops and supplied with food and water. From ten to twenty-five insects are employed per cage, depending on the species. These tests serve to indicate contact and stomach toxicity.

Candidate materials are dissolved in 10 ml. of a suitable solvent, usually acetone. Aliquots of the toxicant solutions are suspended in water containing 0.00175% v./v. Sponto 221, an emulsifying agent, and sprayed on the caged insects. All compounds are screened initially at 0.1%.

Test insects are sprayed with a DeVilbiss hand sprayer at 20 p.s.i. in a fume hood. Final mortality readings are made after seventy-two hours.

The compounds were also tested for contact stomach activity on the salt-marsh caterpillar. The initial concentration used is 0.1%, the test solution being formulated as above described. Dock leaves, approximately five inches long, are dipped in aqueous suspensions of the test materials for ten seconds. They are then placed in one pint food containers with the stems projecting through small holes in the bottoms into vials containing water. Five salt-marsh larvae 8 to 10 days old are introduced and the container closed with a Petri dish lid. Mortality readings are taken at twenty-four and forty-eight hours.

The LD–50 values obtained testing the compound of Example 2 in accordance with the above described procedures are reported in the table below.

TABLE

| Compound | HF | AR | MWB | SMC | 2 SM | | | |
|---|---|---|---|---|---|---|---|---|
| | | | | | PE | N | E | Systemic |
| Example 2 | 10 μg | .03% | | .008% | .003% | | .005% | NA |

HF—House Fly; AR—American Cockroach; MWB—Milkweed Bug; SMC—Saltmarsh Caterpillar; PE—Post-embryonic; N—Nymphal; E—Eggs; μg.—Micrograms of test compound per specimen.

We claim:

1. A bisorganophosphorus ester of the following general formula:

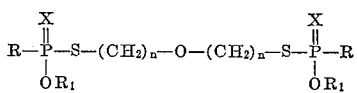

wherein R and $R_1$ represent lower alkyl radicals, X is a chalcogen selected from the class consisting of oxygen and sulfur and $n$ is an integer of from 1 to 2.

2. Bis - [2 - (O - ethyl ethylphosphonodithioyl) ethyl] ether.

3. Bis - (O - ethyl ethylphosphonodithioyl) methyl ether.

4. Bis - (O - methyl ethylphosphonothioyl) methyl ether.

References Cited by the Examiner

UNITED STATES PATENTS

| | | | |
|---|---|---|---|
| 2,631,962 | 3/1953 | Moore | 167—22 |
| 2,686,760 | 8/1954 | Watson. | |
| 2,786,009 | 3/1957 | Pianfetti et al. | 167—22 |
| 2,884,353 | 4/1959 | Christman | 260—461 |
| 2,885,430 | 5/1959 | Scherer et al. | 260—461 |
| 3,042,700 | 7/1962 | Birum | 260—461 |
| 3,042,701 | 7/1962 | Birum | 260—461 |
| 3,058,876 | 10/1962 | Birum | 260—461 |
| 3,075,873 | 1/1963 | Richter | 260—461 |
| 3,097,997 | 7/1963 | Szabo et al. | 260—461 |
| 3,100,735 | 8/1963 | Szabo et al. | 260—461 |

OTHER REFERENCES

Kabachnik et al., "Zhur. Obshchel Khim.," vol. 28, pp. 1568–1573 (1958).

CHARLES B. PARKER, *Primary Examiner.*

MORRIS O. WOLK, *Examiner.*

Notice of Adverse Decision in Interference

In Interference No. 96,325 involving Patent No. 3,236,919, K. Szabo and J. G. Brady, BISORGANOPHOSPHORUS ESTERS, final judgment adverse to the patentees was rendered June 12, 1969, as to claim 3.

[*Official Gazette August 5, 1969.*]

Disclaimer 3,236,919.—*Karoly Szabo*, Pleasantville, N.Y., and *John G. Brady*, San Jose, Calif. BISORGANOPHOSPHORUS ESTERS. Patent dated Feb. 22, 1966. Disclaimer filed Aug. 27, 1969, by the assignee, *Stauffer Chemical Company*.

Hereby enters this disclaimer to claim 3 of said patent.

[*Official Gazette December 9, 1969.*]